Feb. 5, 1924.
G. H. DU PAUL
1,482,739
TEMPLE FOR SPECTACLES AND THE LIKE
Filed July 7, 1923
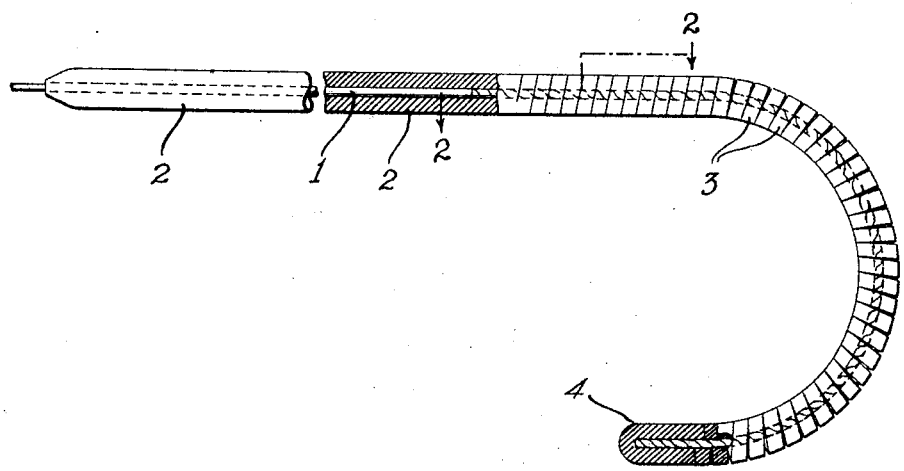
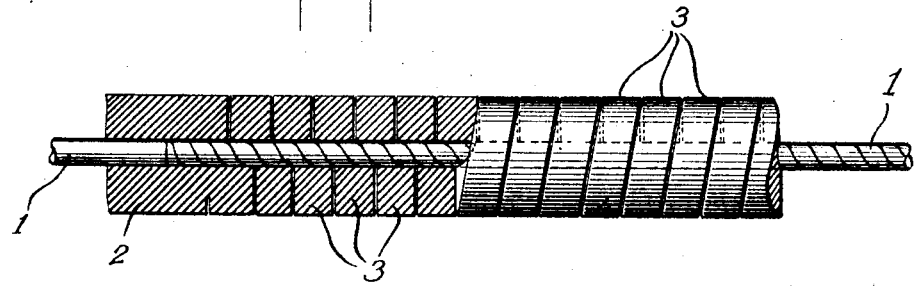
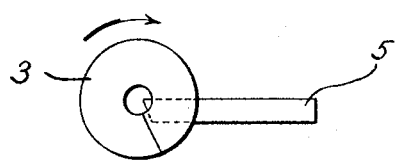
INVENTOR
GEORGE H. DuPAUL
BY
John W. Thompson
his ATTORNEY Patented Feb. 5, 1924.

1,482,739

UNITED STATES PATENT OFFICE.

GEORGE H. DU PAUL, OF SOUTHBRIDGE, MASSACHUSETTS, ASSIGNOR TO DU PAUL YOUNG OPTICAL CO., OF SOUTHBRIDGE, MASSACHUSETTS, A CORPORATION OF MASSACHUSETTS.

TEMPLE FOR SPECTACLES AND THE LIKE.

Application filed July 7, 1923. Serial No. 650,003.

*To all whom it may concern:*

Be it known that I, GEORGE H. DU PAUL, a citizen of the United States, and a resident of the city of Southbridge, county of Worcester, State of Massachusetts, have invented an Improvement in Temples for Spectacles and the like, of which the following is a specification.

The present invention relates to an improvement in temples for spectacles and the like. The improvement has to do more particularly with that type of temple comprising a metallic member or core of relatively small gauge encased in a non-metallic cover usually of celluloid or similar substance. It has been the purpose of manufacturers of these devices to develop a temple which would combine security of attachment with a maximum of comfort to the wearer. The type of temple hereinabove referred to has been satisfactory in these respects, particularly where the covering of the ear engaging portion of the temple is in the form of a coiled spring of celluloid or other suitable material surrounding the flexible core of the metallic member. This construction combines a sufficient amount of resiliency to hold the temples in place with a factor of pliability which makes it possible to shape the ear engaging end of the temple so as to conform to various conditions of use.

In the manufacture of the coiled spring portion of the temple hereinabove referred to, it is the practice to coil a wire of celluloid or other suitable material around a mandrel, reducing the irregular surface caused by the exposed round surfaces of the wire to a substantially continuous cylindrical surface which will be more comfortable when engaging the ear of the wearer than would be the relatively irregular surface. One end of the coil thus formed is then secured as by gluing to one end of a relatively rigid tubular member and when both are mounted on the metallic core of the temple the covering appears to be a single piece.

The method of making the flexible portion of the covering member as hereinabove described involves a number of steps and takes considerable time, thus rendering the operation unduly expensive as a manufacturing proposition. Moreover, the joint formed between the coiled wire portion and the rigid portion is frequently defective and results in the breaking of the temple at that point.

An object of my invention has been to evolve a method by which I can greatly simplify the manufacture of coverings for the metallic cores of temples and to provide a form of temple which will not be subject to the weaknesses and insufficiencies of the type hereinabove described.

One embodiment of my invention is illustrated in the drawings forming a part of the present specification, and in which—

Figure 1 is a side view of a temple with a part of the rigid portion thereof broken away, Figure 2, a simple longitudinal section on the line 2—2 of Figure 1, and Figure 3, a diagrammatic illustration of the method of producing a construction according to Figures 1 and 2.

As indicated in the drawings, my improved temple consists of a metallic core 1 encased in a covering of celluloid or other suitable material having a rigid shank portion 2, and a relatively flexible portion 3 integral with the rigid portion 2 and with a rigid terminal portion 4. In forming this covering member, I utilize a tubular blank of celluloid or other suitable material of the required length, one end of which provides the rigid portion 2 while the flexible portion 3 is formed by making a continuous helically directed cut through the wall of the blank, the details of which are shown more clearly in Figure 2. This operation results in the formation of a section similar in form and characteristics to a helical tension spring and wherein the resiliency of the material normally tends to hold the contiguous coils together to form a substantially continuous cylindrical surface for engagement with the ear of the wearer when the covering is in place on the metallic core 1.

Where my method of forming the flexible portion of the temple covering is followed, I turn out in a single operation a spring-like device which has the additional advantage of being integral with the rigid portion, thus providing a much more durable covering than one made up of two pieces glued together. In the diagrammatic representation of the method of making my improved temple covering, the tubular blank may be rotated in the direction of the arrow against the cutting edge of a suitable cutter 5, which may be moved in the direction of the longitudinal axis of the blank at a predetermined rate or the blank may be moved with respect to the cutter, the object being to secure relative movement between the cutter and the blank in order to provide a spiral or helical cut through the wall of the blank.

While I have illustrated my method of forming a helically coiled article in connection with temples for spectacles, it is obvious that the method may as effectively be employed in producing coiled articles for other purposes.

I claim as my invention:

1. A temple for spectacles and the like comprising a metal core having a relatively straight shank portion and a loop portion, and a non-metallic covering for said core consisting of a single tubular member having a flexible loop covering portion coextensive with a helically disposed cut extending through the wall thereof, one end of said covering having the free end of the loop embedded therein.

2. A temple for spectacles and the like comprising a metal core having a relatively straight shank portion and a loop portion, and a non-metallic covering for said core consisting of a single tubular member having a flexible loop covering portion coextensive with a helically disposed cut extending through the wall thereof, one end of said covering being closed and having the free end of the loop embedded therein.

3. A temple for spectacles and the like comprising a metal core having a relatively straight shank and a loop, and a non-metallic covering for said core consisting of a tubular member having a flexible portion interposed between relatively rigid portions and co-extensive with a helically disposed cut extending through the wall of said tubular member, and one of said rigid portions being positioned on the core to engage the free end of the loop.

I testimony whereof, I have signed my name to this specification this 27th day of June, 1923.

GEORGE H. DU PAUL.